US006715388B1

(12) United States Patent
Jaksha

(10) Patent No.: US 6,715,388 B1
(45) Date of Patent: Apr. 6, 2004

(54) ADJUSTABLE SPLITTER AND ANTI-KICKBACK DEVICE FOR POWER SAWS

(76) Inventor: Jerome Francis Jaksha, 804 Tulip Rd., Rio Rancho, NM (US) 87124

( * ) Notice: Subject to any disclaimer, the term of this patent is extended or adjusted under 35 U.S.C. 154(b) by 0 days.

(21) Appl. No.: 10/260,125

(22) Filed: Sep. 28, 2002

(51) Int. Cl.[7] ................................ B23D 45/06
(52) U.S. Cl. ................................ 83/102.1; 30/371
(58) Field of Search ................................ 83/102.1; 30/371, 30/373; 144/253.1

(56) References Cited

U.S. PATENT DOCUMENTS

| | | | | | |
|---|---|---|---|---|---|
| 129,193 | A | * | 7/1872 | Tompkins | 83/102.1 |
| 421,861 | A | * | 2/1890 | French | 83/860 |
| 1,125,637 | A | * | 1/1915 | Beaudry | 83/102.1 |
| 1,435,252 | A | * | 11/1922 | Neal | 83/102.1 |
| 2,007,887 | A | * | 7/1935 | Tautz | 83/102.1 |
| 2,377,673 | A | * | 6/1945 | Chaddock | 30/373 |
| 2,530,867 | A | * | 11/1950 | Galanga | 83/102.1 |
| 2,916,062 | A | * | 12/1959 | Clauson | 30/373 |
| 3,232,326 | A | * | 2/1966 | Speer | 83/102.1 |
| 3,566,934 | A | * | 3/1971 | Thrasher | 83/102.1 |
| 3,583,450 | A | * | 6/1971 | Gunnerman | 83/701 |
| 4,976,566 | A | * | 12/1990 | Yeomans | 403/374.2 |
| 5,279,037 | A | * | 1/1994 | Leatherman | 30/373 |
| 6,170,370 | B1 | * | 1/2001 | Sommerville | 83/102.1 |

FOREIGN PATENT DOCUMENTS

| | | | |
|---|---|---|---|
| CH | 111170 | * | 8/1925 |

* cited by examiner

*Primary Examiner*—Kenneth E. Peterson

(57) ABSTRACT

A device for laterally positioning a splitter downstream of a saw blade. The rotatable splitter holder is fastened behind a circular sawblade. The splitter keeps cut lumber or other material from becoming misaligned or pinching the back of a circular saw blade. Adjustment for alignment with saw-blade is acomplished by rotating the base and attached splitter pin. Splitter width is adjustable with interchangable splitter inserts and bushing. A variation eliminates splitter friction while maintaining kerf width. This device is particularly suitable for an improved tablesaw throatplate. It can added to the deck or trunion of a tablesaw. The same device can also be used to prevent kickback and improve cuts with a handheld circular saw.

9 Claims, 8 Drawing Sheets

Fig 1
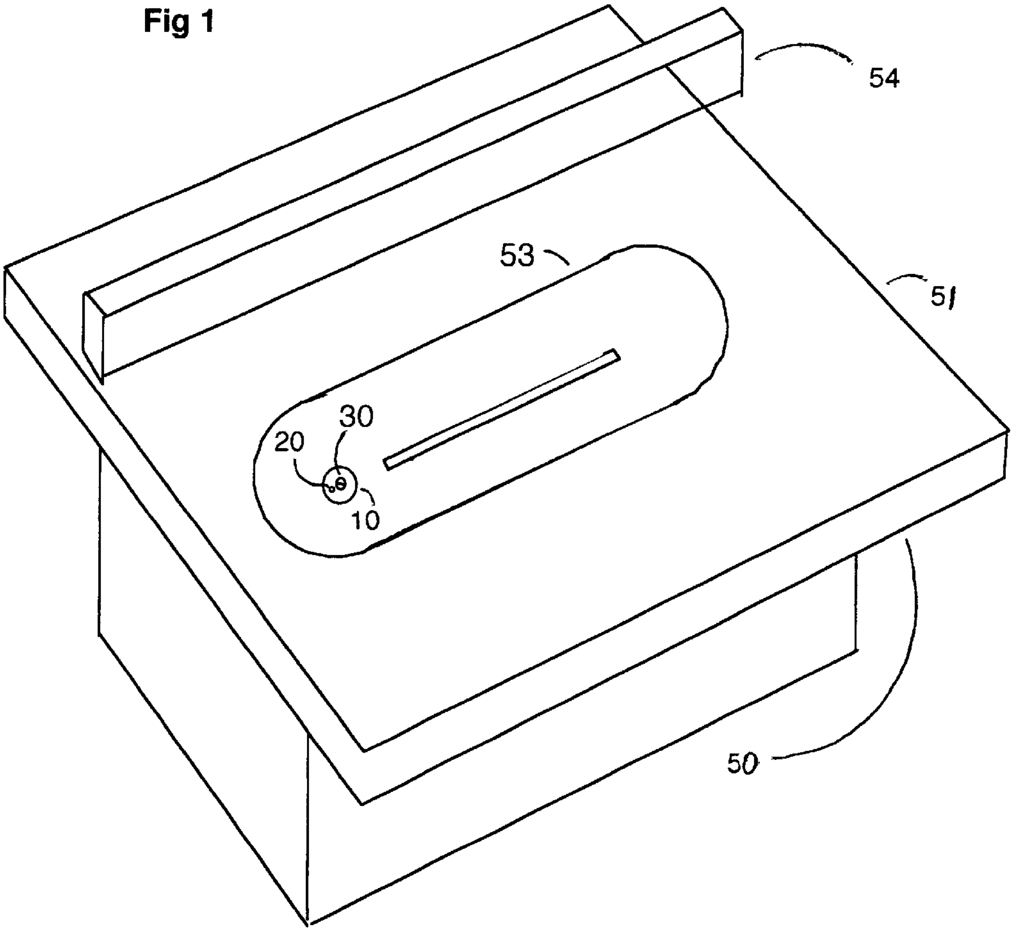
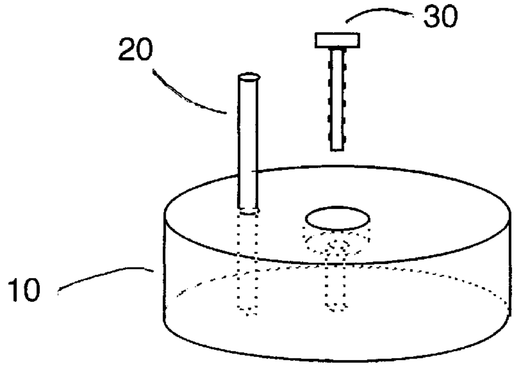
Fig 2

Fig 7
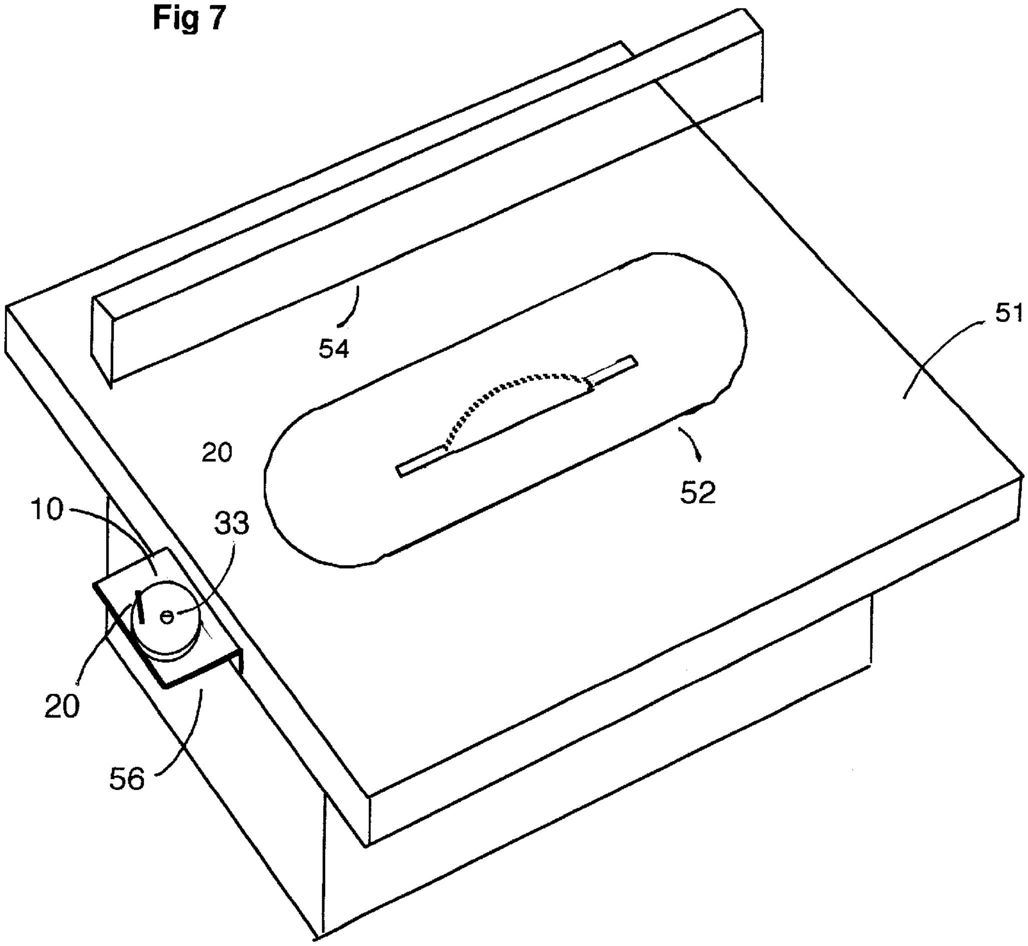
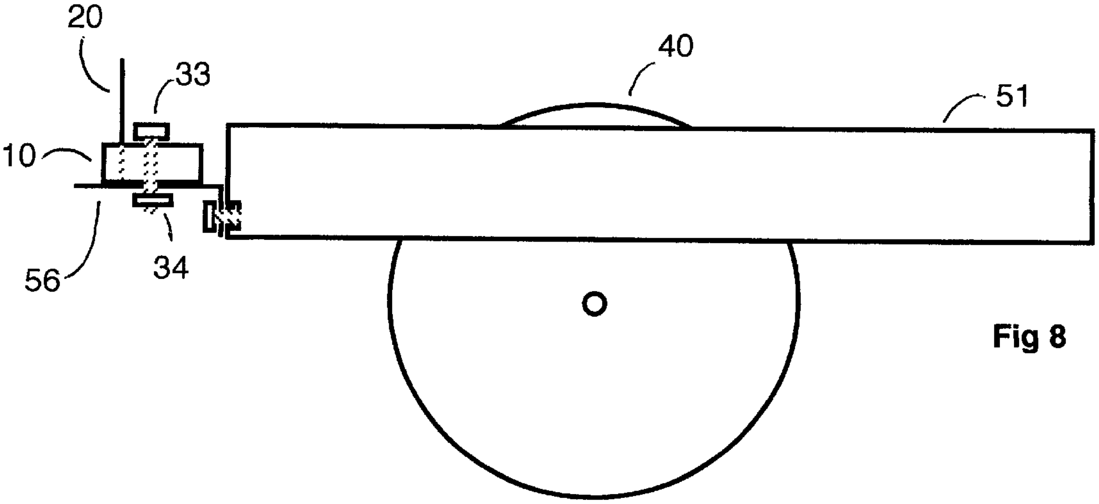
Fig 8

ADJUSTABLE SPLITTER AND ANTI-KICKBACK DEVICE FOR POWER SAWS

CROSS-REFERENCE TO RELATED APPLICATIONS not applicable

FEDERALLY SPONSERED RESEARCH not applicable

BACKGROUND OF THE INVENTION

1. Field of Invention

A workpiece cut with a circular saw blade has material removed by the cutting teeth upstream of the blade center. This "kerf" needs to be kept laterally aligned with the plane of the blade so that saw teeth moving upward through the kerf downstream of the blade do not contact the cut sides of the workpiece. A board ripped having internal stresses may spring together, binding the rear of the sawblade. These teeth then cut further into the cut edges, causing kickback and ragged cuts.

BACKGROUND

2. Discussion of Prior Art

Splitters have been part of tablesaws for nearly 100 years. Most combine splitter and guard. This creates problems when narrow pieces are ripped, because the guard interferes with controling the workpiece. Over 90% of guards (with splitters attached) are removed from tablesaws because of this problem, leaving the saw without either splittter or guard. A typical splitter aassembly for a table saw is shown in U.S. Pat. No. 4,625,604. Downstream of the blade is a splitter device which maintains separation of the cut material by virtue of its location in the kerf. Other types of splitter devices are shown, for example, in U.S. Pat. No. 2,530,867. The device is of a fixed thickness and, hence, cannot readily accommodate varying thickness in saw blades, particularly in respect of the newer ultrathin saw blades. U.S. Pat. No. 3,566,934 shows an lateraly adjustable splitter device with opposing longitudinally offset resilient contacts which fit within the kerf defined by the saw blade cut. This device recognizes the need for lateral adjustment, but is complicated, expensive, and is not applicable for retrofit on existing tablesaws It is common for woodworkers to insert a thin flat stick into a throatplate behind the blade to act as a splitter. These are not laterally adjustable. Previously I have taught inserting a drill bit into a throatplate behind a sawblade.

Unless lateral splitter adjustment is accurate, splitters must be thinner than the kerf to compensate for alignment errors. These thin splitters cannot keep the kerf fully open. Because of this conventional splitters rely on pawls on top of the workpiece to stop kickback after it starts. Ragged cuts and "kickback" can result from "splitters" which are narrower than the kerf, or are misaligned with the kerf, or are not stable laterally.

No existing splitter is both infinitly adjustable for lateral position and easily adjusted for blade width.

Splitter-guard combination devices cannot be used for non through cuts, such as dado and resaw cuts.

Objects and Advantages

This invention provides infinite lateral adjustment and variable splitter width. It is very simple and inexpensive to manufacture. Retrofit installation is as simple as replacing a throatplate in one variation. A splitter equal in dimension to the kerf prevents binding on the rear of the circular blade. Changing sawblade kerf width requires changing size and therefore splitter lateral postiton for best anti-kickback effect. The splitter width in this device can be changed without tools in seconds. Changing lateral position requires 5 seconds and a dime or a screwdriver. Accurate lateral adjustment, precise splitter sizing, and solid fixation of a splitter keeps the rear teeth of a circular blade from touching the wood inside the kerf. This aligns the board during the cut and keeps the kerf fully open, which combined with holding the workpiece down, prevents the major causes of kickback.

One aspect of this invention shows a cylindrical splitter pin, rotated around an axis to move laterally while rotated. This laterally adjustable splitter pin can have the right kerf dimension by easily changing splitters, splitter pins, or spacer bushings.

A further aspect of this invention combines two offset splitter pins with bearing bushings to eliminate friction from boards which try to pinch the blade, but cannot because the splitter bearings prevent pinching.

Conventional splitters with guard attached must be removed for rip cuts where the blade is close to the fence. This splitter does not need to be removed for any cut and can be used with hold down springs and overhead guards.

Another aspect of this invention is to provide a simple, economical, adjustable splitter for handheld power circular saws which also makes straight line cuts easier to accomplish.

One objective is to provide a tablesaw throatplate which has an integral laterally adjustable, variable width splitter. Another object of this invention is to provide a splitter which can be easily attached to an existing sawdeck or tablesaw throatplate.

Another object is to provide a tablesaw splitter which does not interfere with hold downs and guards positioned above the sawblade.

Another object is to provide a splitter for hand held power saws which keeps the rear of the blade from moving lateraly into the workpiece.

A further objective is to provide a very economical splitter to replace those removed when the combination splitter/guard is temporarily or permanently removed.

SUMMARY

According to an aspect of the invention, there is provided a device for removably securing a laterally adjustable circular saw splitter device downstream of a saw blade, the device comprising a splitter dowel holder able to rotate about an axis parallel to a sawblade, and a variable size splitter dowels protruding through the saw deck from the splitter dowel holder. Certain variations of the invention are very simple and inexpensive to produce, while others allow greater flexibility in operation.

BRIEF DESCRIPTION OF THE DRAWINGS

Various embodiments of the invention are described with respect to the drawings wherein:

FIG. 1 is a perspective view of a table saw showing the splitter device in position downstream of the saw blade in the throatplate FIG. 2 is an enlarged perspective view of the splitter device

FIG. 7 is a side view of the tablesaw and splitter

FIG. 8 is a perspective view of the tablesaw arbor and splitter

DETAILED DESCRIPTION OF THE PREFERRED EMBODIMENTS OF THE INVENTION

Figure 3:
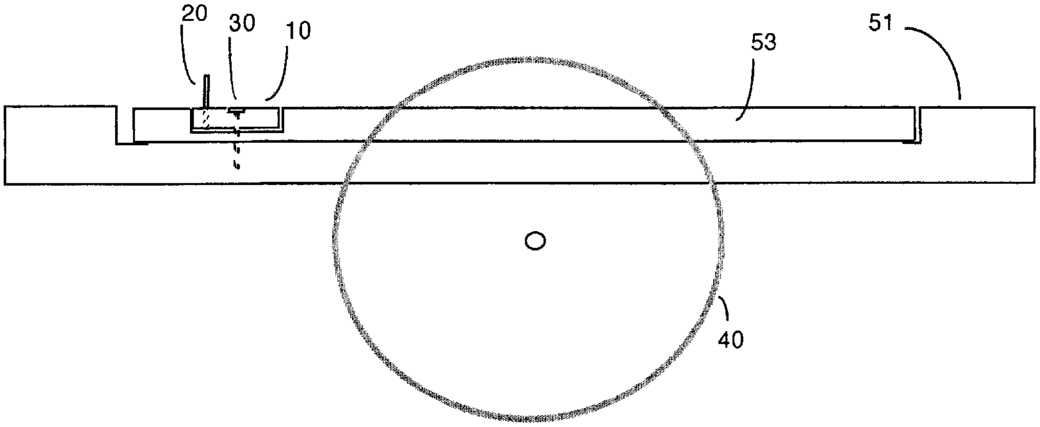
FIG. 3 is a section side view of the tablesaw and splitter device in FIG. 1

A splitter equal in dimension to the kerf prevents binding on the rear of the circular blade. Changing sawblade kerf width requires changing size and therefore splitter lateral postiton for best anti-kickback effect. Easy, fast removal and change of splitter position and width are required for sawyers to use a splitter, rather than remove and discard them as is done with the splitters which come installed on a tablesaw. The following devices accomplish these goals at a minimum cost.

A preferred application of the device for securing a table saw splitter downstream of the saw blade is described in FIG. 1.

FIG. 1 shows a table saw 50 having a tablesaw deck 51. Said tablesaw deck has a throat plate 53 with sawblade void 41. The splitter holder 10 is rotated, moving the splitter 20 laterally into a position directly behind the saw blade 40. The screw 30 holds the splitter down and in the selected rotational positon. This rotation of the protruding splitter privides the needed lateral motion of the splitter for accurate positioning. Accurate lateral positioning allows the sawyer to use precise width splitters without creating workpiece impingementon the splitter.

FIG. 2 shows the splitter holder, a removable splitter pin, and screw to hold it in place.

Figure 4:
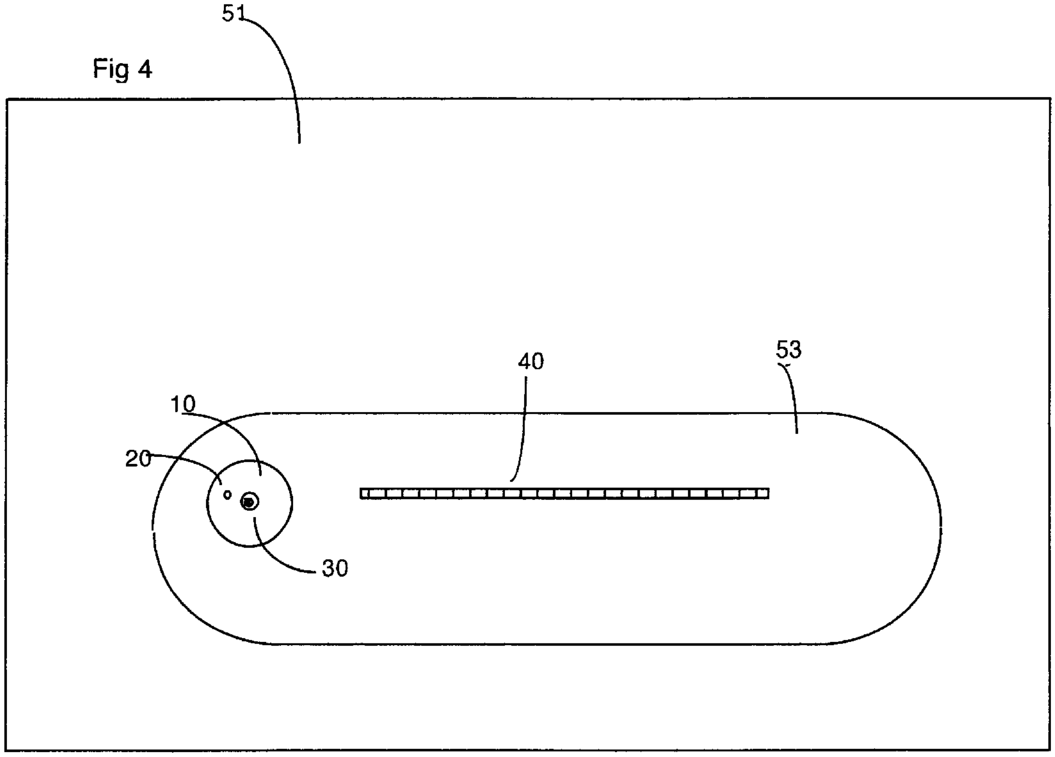
FIG. 4 top view of tablesaw and splitter device

FIG. 3 and FIG. 4 show a preferred embodiment with the splitter holder and splitter pin in the void of throatplate 53, held in position by screw 30.

Figure 5:
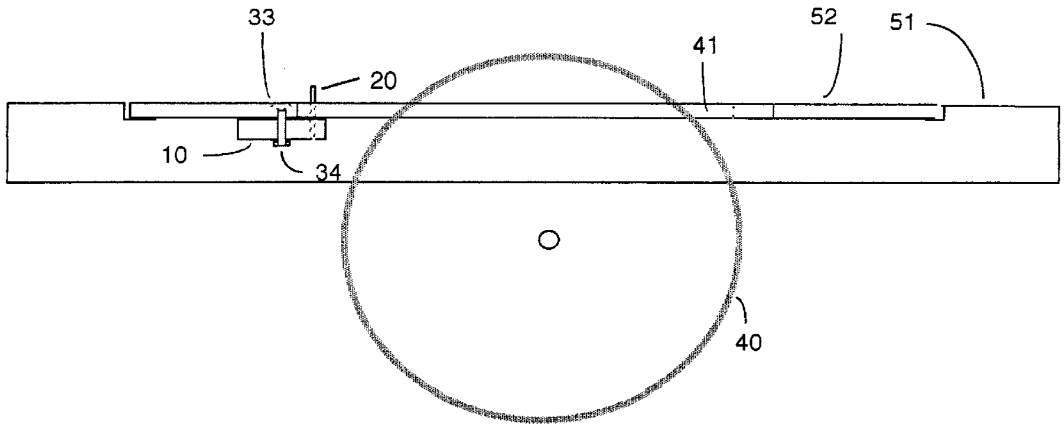
FIG. 5 is a section-side view of the table saw and splitter device
Figure 6:
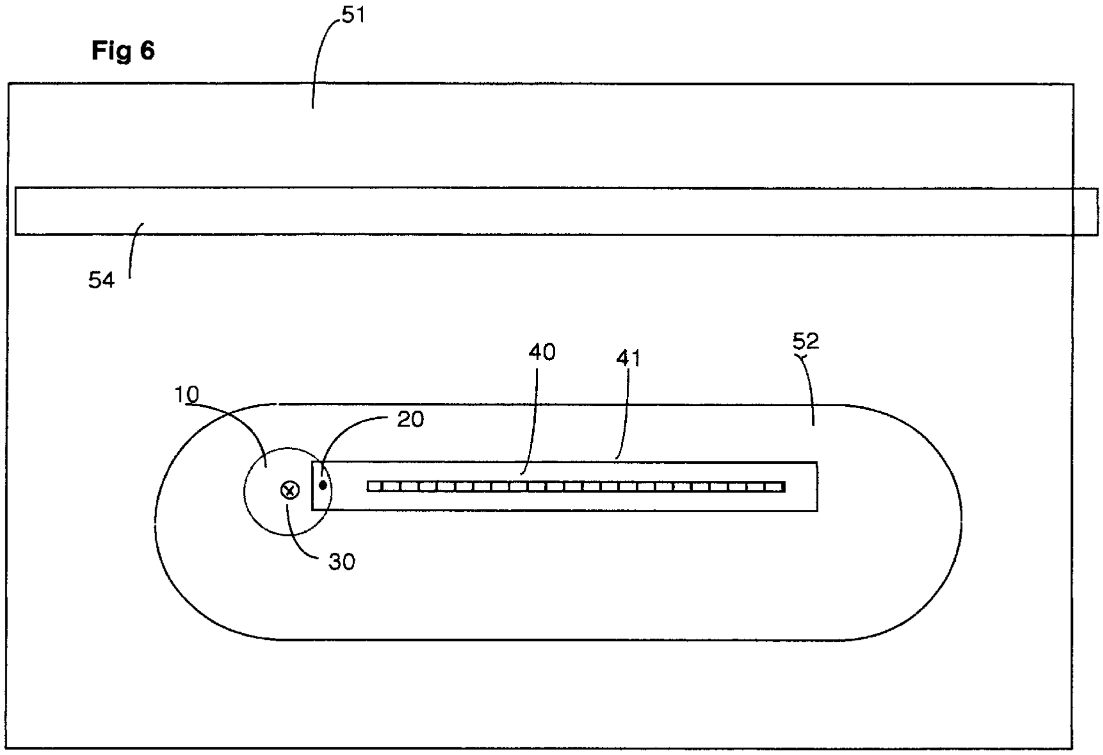
FIG. 6 is a top view of the table saw and splitter device

FIG. 5 and FIG. 6 show another place of attachment, the typical metal throatplate 52. It shows the splitter device attached below the throatplate, following the sawblade 40, held with machine screw 33, and machine nut 34. The splitter pin extends above the throatplate 52 through the typical wide sawblade void 41.

Figure 15:
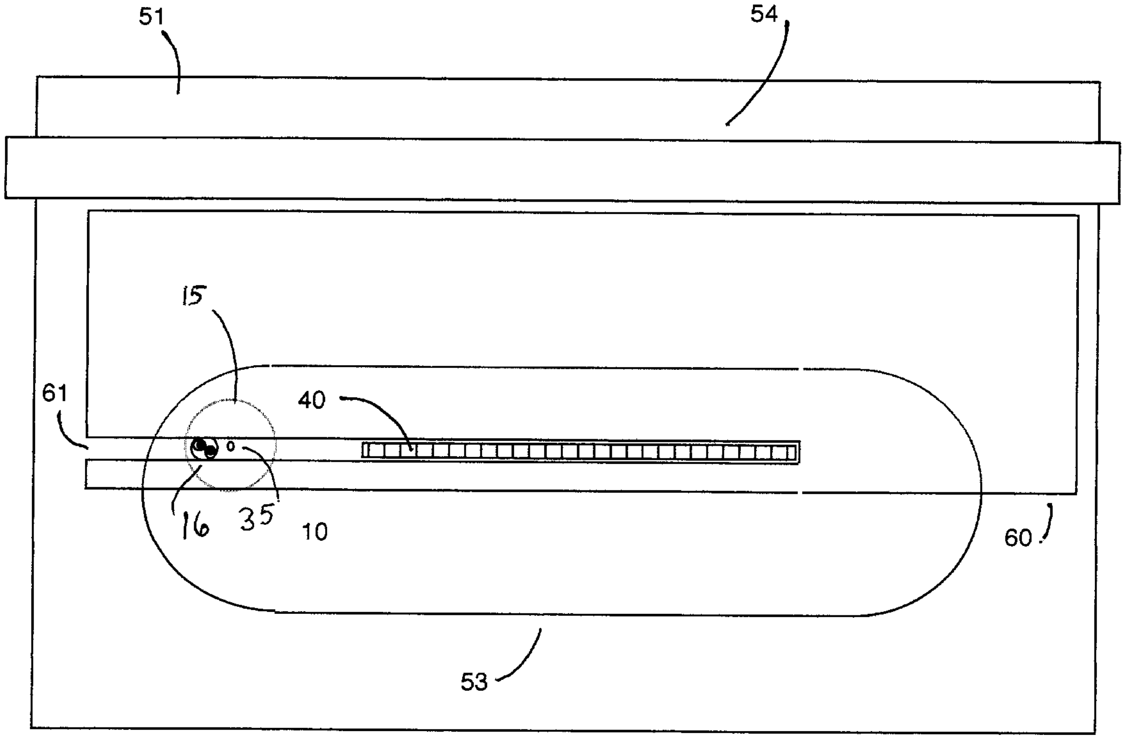
FIG. 15 is a top view of the splitter devices

This cutting action is shown intop view in FIG. 15 where the workpiece 60 is pushed into the sawblade 40 which cuts a kerf 61 in the workpiece 60. The variable width splitter 26 of claim 20 shown in this embodiment enters the sawkerf 61 after the blade 40, maintaining kerf width and position, preventing the rear teeth of sawblade 40 from contacting workpiece 60.

FIG. 7 and FIG. 8 show an embodiment wherein the splitter holder10 is attached to the tablesaw deck 51 by means of aretrofit attachment angle 56 held after and below the sawdeck51. The splitter holder could obviously be directly attached into a void in a tablesaw deck behind the throatplate, as it is held in the throatplate of FIGS. 3 and 4

Figure 16:
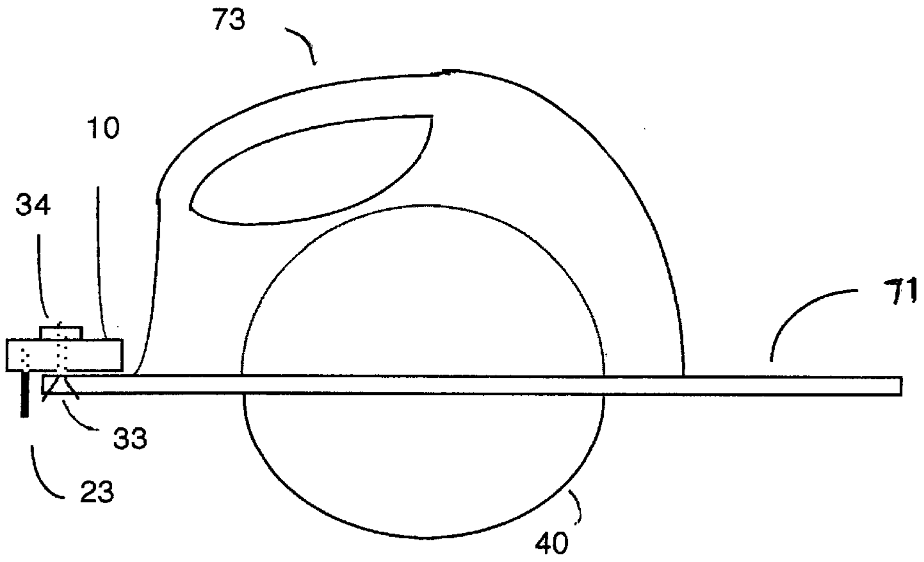
FIG. 16 is a side view of the splitter devices
Figure 17:
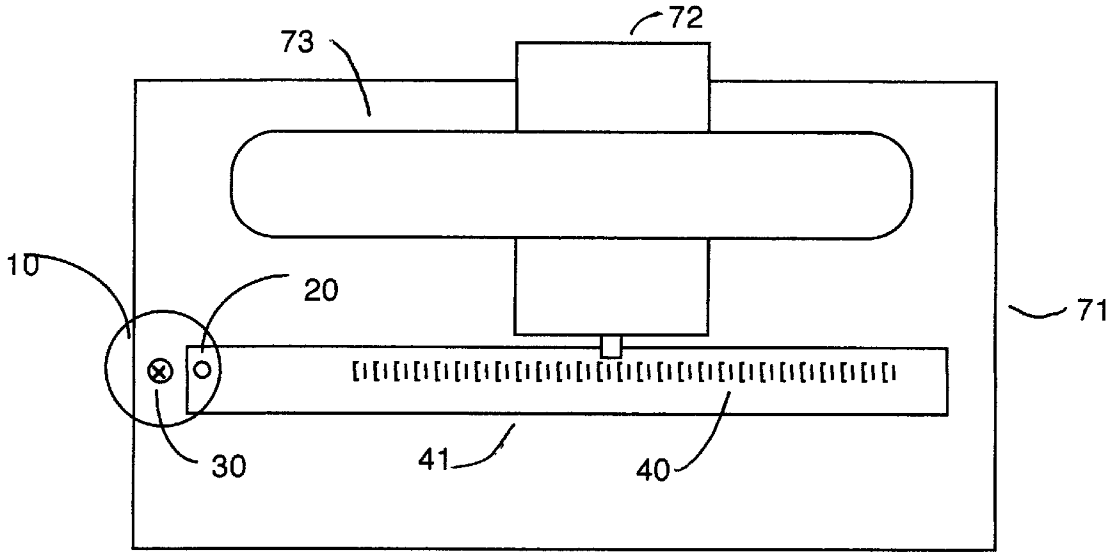
FIG. 17 is a top view of the splitter devices

FIG. 16 and FIG. 17 show the splitter holder 10 and splitter 20 attached to a handheld power circular saw baseplate. The saw rear is held from moving laterally into the kerf, preventing kickback and helping the operator to make straight cuts. Straight cuts prevent the blade from binding due to an arc cut.

The embodiments above allow use only with a vertical sawblade. Since over 95% of all cuts are made with a vertical blade, their usefulness is obvious. They can be easily and inexpensively retrofitted to any table saw or handheld circular saw, and easily removed for tilted cuts. Easy, inexpensive retrofit make their use more likely, preventing accidents.

Figure 11:
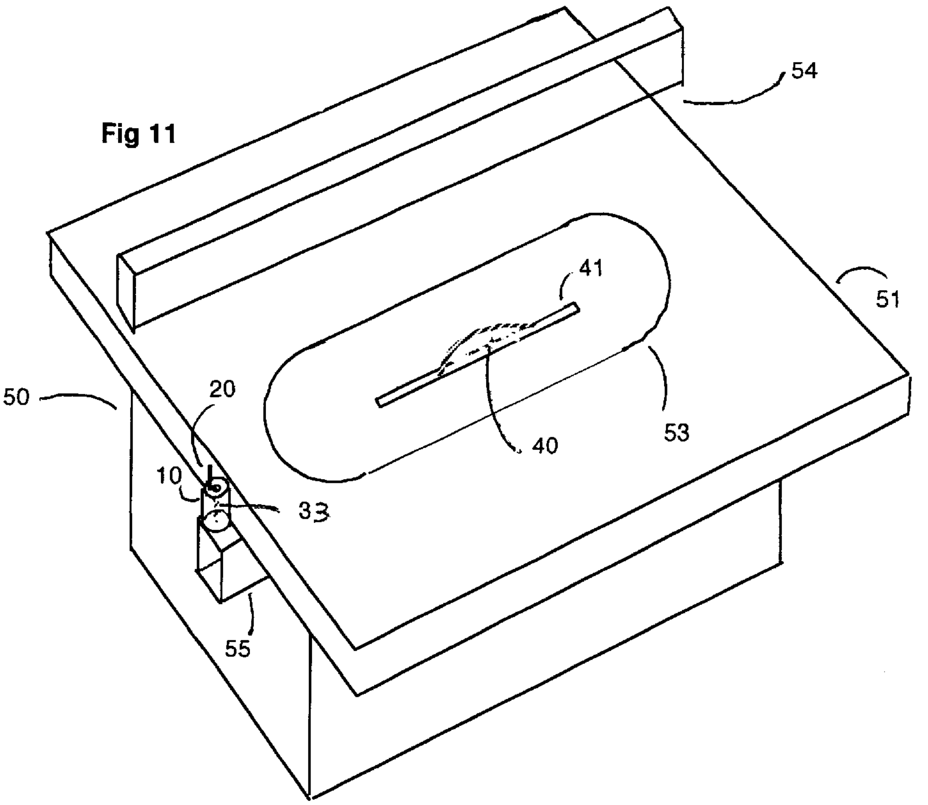
FIG. 11 is a perspective views of the splitter devices
Figure 10:
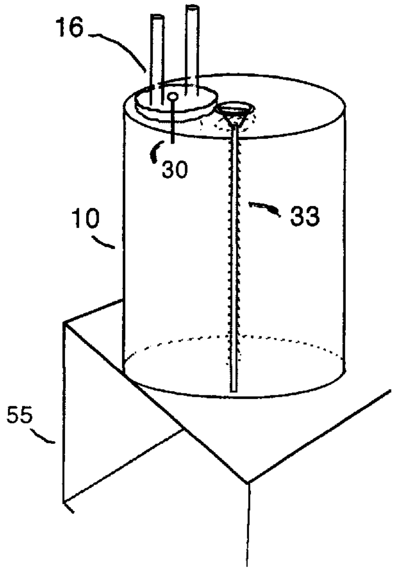
FIG. 10 is a perspective views of the splitter devices
Figure 9:
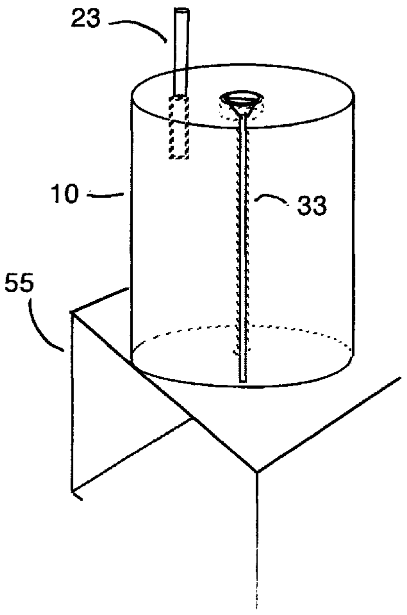
FIG. 9 is a perspective view of the splitter devices

FIG. 9, FIG. 10, and FIG. 11 show another embodiment which keeps the splitter 20 parallel with sawblade 40. A relatively long rotatable splitter holder 15 is attached to tilting saw trunion 53 by means of a machine screw. Retrofit to an existing trunion would require a machined flat area on top of the existing trunion, or an adaptor plate bolted to the existing trunion, such as the one attached to the sawdeck 51 in FIG. 7 and FIG. 8. The splitter holder could obviously be attached closer to the blade on the trunion, keeping the splitter in the throatplate area behind the blade.

Figure 12:
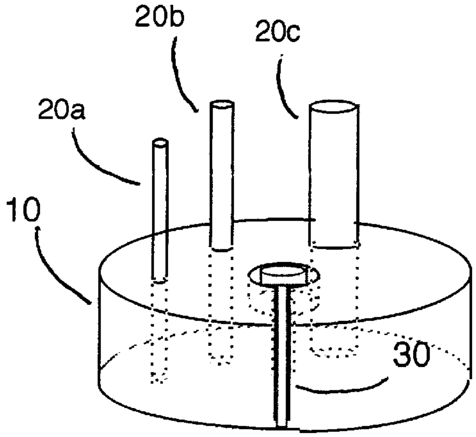
FIG. 12 is a perspective views of the splitter devices
Figure 14:
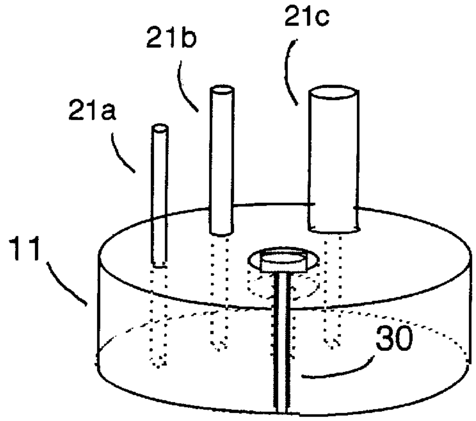
FIG. 14 is a perspective views of the splitter devices
Figure 13:
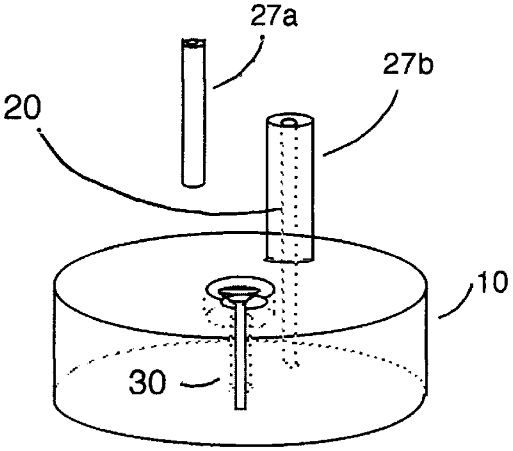
FIG. 13 is a perspective views of the splitter devices

FIG. 12, FIG. 13, and FIG. 14 show various embodiments of splitters which fit into the rotating splitter holders 10, 11, and 15

FIG. 10 and FIG. 15 shows an embodiment wherin splitter 16, contains two protruding splitter pins. Splitter 16 is able to rotate on it's own axis independent of the movement of splitter holder 10. Splitter 16 is inserted into a cylindrical void in splitter holder 15 and held in position with screw 35. Rotating the double pin splitter 16 changes the effective lateral dimension relative to the saw kerf 61, and provides a means of changing effective splitter width while allowing lateral positioning by rotating splitter holder 10.

FIG. 12 shows an embodiment wherin the splitter holder 11 having vertical cylindrical voids containing removable splitter pins of various diameters. The splitters 20*a*, 20*b*, and 20*c* are removed and replaced as needed to match kerf width.

FIG. 14 shows an embodiment wherin the splitter holder 12 having a vertical cylindrical void containing removable splitter pins with varying diameters in the wood contact area above the splitter holder 12. The splitters 21*a*, 21*b*, and 21*c* are removed and replaced as needed to match kerf width.

FIG. 1 shows an embodiment wherin the splitter holder 10 has a vertical cylindrical splitter which is used as an axle to hold removable bushings with varying outside diameters such as bushing 27*a* and 27*b*. Bushings 27*a* and 27*b* are removed and replaced as needed to match kerf width. Threading the splitter and splitter holder provides a solid attachment and also provides the unexpected benefit of becoming an excellent hold down device when a cut board pinches the splitter due to released internal stresses, compressing the wood into the sharp sides of the threads.

Although preferred embodiments of the invention have been described herein in detail, it will be understood by those skilled in the art that variations may be made thereto without departing from the spirit of the invention or the scope of the claims.

Conclusion

The need for a better splitter is obvious because 95% of all splitters are removed from the saws. There is need for a splitter which is adjustable laterally and in width, because this type of splitter offers unexpected benefits in anti-kickback control and cut accuracy. There is a need for a splitter which works independent of a guard, which can be used with overhead guards. There exists a need for a splitter whch works with zero-clearance throatplates.

There continues to be a demand for a simply constructed, readily installed and quickly removable or changeable splitter device which can be used with overhead guards and hold down devices and which may be universally mounted on any type of table saw.

Quoting the editorial in American Woodworker magazine October 2002 "Waste pieces get stuck under the pawls. Worst of all is the monkeying around you have to do to remove and replace the darn thing. It's as if they're designed to make us throw them away" same issue "Question—Is there a splitter that can be used for resawing on a tablesaw? Answer—It's unfortunate but true, you can't use a conventional splitter for resawing on a tablesaw" Most manufacturer installed tablesaw splitters are removed and never used because the attached guard "gets in the way" and causes loss of workpiece control, particularly on narrow and short boards when the sawblade is close to the rip fence. Conventional splitters which are never replaced after removal do not stop kickback. The easy installation and removal and adjustment of the described splitters promotes using them when helpful for safety and accuracy. Their simplicity and concurent low cost makes it possible for anyone to have a usable splitter for the price of the board they are cutting.

| Drawings<br>Drawings-list of reference numerals |
|---|
| 10. splitter holder |
| 11. splitter holder with multiple holes |
| 15. long cylinder splitter holder |
| 16. variable width independently rotatable splitter |
| 20. splitter |
| 21. replacement splitters with variable size shoulders |
| 22. variable diameter replacement splitters |
| 23. threaded splitter |
| 24. splitter with bushing |
| 25. double pin splitter |
| 26. adjustable width splitter |
| 27. bushing |
| 27a bushing |
| 27b bushing |
| 30. screw |
| 32. threaded dowel |
| 33. machine screw |
| 34. machine nut |
| 40. sawblade |
| 41. sawblade void |
| 50. tablesaw |
| 51. tablesaw deck |
| 52. typical metal throatplate |
| 53. typical zero clearance throatplate |
| 54. rip fence |
| 55. tilting tablesaw trunion |
| 56. retrofit attachment angle |
| 60. workpiece |
| 61. kerf in workpiece |
| 70. handheld circular saw |
| 71. handheld circular saw baseplate |
| 72. handheld circular saw motor |
| 73. handheld circular saw handle |

What is claimed is:

1. A device for rotatably aligning and securing a splitter downstream of a vertical saw blade, said device comprising:

i) a workpiece engaging surface and a saw blade having a rotational axis, said saw blade extending thru an opening in said workpiece engaging surface, ii) a horizontally rotatable splitter base attached to said workpiece engaging surface downstream of said saw blade, said splitter base having an axis of rotation perpendicular to said rotational axis of said saw blade, iii) said rotatable splitter base having one or more substantially cylindrical splitter projecting parallel to the rotational axis of said base, said splitter positioned between the rotational axis of said base and the perimeter of said base so that when said splitter base is rotated the splitter is adjusted laterally to a saw kerf, iiii) a means of removably holding said base in any rotated position about said axis.

2. A device of claim 1 wherein said protruding splitter is cylindrical and is sheathed in a tubular bushing.

3. A device of claim 1 wherein said one or more substantially cylindrical splitter comprises two parallel cylindrical axles that protrude above said splitter base, having tubular bushings positioned around each said axle, whereby friction between splitter and wood is reduced and kerf width maintained.

4. A device of claim 1 wherein said splitter is removable, and replaceable.

5. A device of claim 1 wherein said splitter base contains plural holes of differing diameter, said holes extending parallel to the rotational axis of said splitter base, and wherein said one or more substantially cylindrical splitter comprises plural removable cylindrical dowels having respective diameters that match the respective diameters of the holes in said splitter base.

6. A device of claim 1 wherein i) said base contains one or more cylindrical holes parallel to said rotational axis of said base positioned between said rotational axis and said perimeter of said base, said cylindrical holes being substantially equal in diameter to the diameter of said one or more substantially cylindrical splitter.

7. A device of claim 1 wherein said rotatable splitter comprises:

i) said throatplate contains a cylindrical void downstream of said sawblade containing ii) said rotatable mounting base held down and in adjusted rotational position by a fastening means through a central hole in said base to said throatplate.

8. A device of claim 1 wherein said rotatable splitter base is removeably fastened to the bottom of a throatplate and held in adjusted rotational position by a fastening means through a central hole in said rotatable splitter base, whereby said splitter protrudes through said opening, said splitter being able to be rotated for adjustment within said hole.

9. A device of claim 1 wherein said one or more substantially cylindrical splitters have diameters that increases as they extend away from said base.

* * * * *